3,623,910
METHOD AND APPARATUS FOR LAUNDERING DUST COLLECTORS
Roland B. Calhoun, Glencoe, and Robert H. Ernest, Hinsdale, Ill., assignors to Flex-Kleen Corp., Chicago, Ill.
Filed Nov. 28, 1969, Ser. No. 880,640
Int. Cl. B08b *3/02, 3/04;* B01d *46/04*
U.S. Cl. 134—34        16 Claims

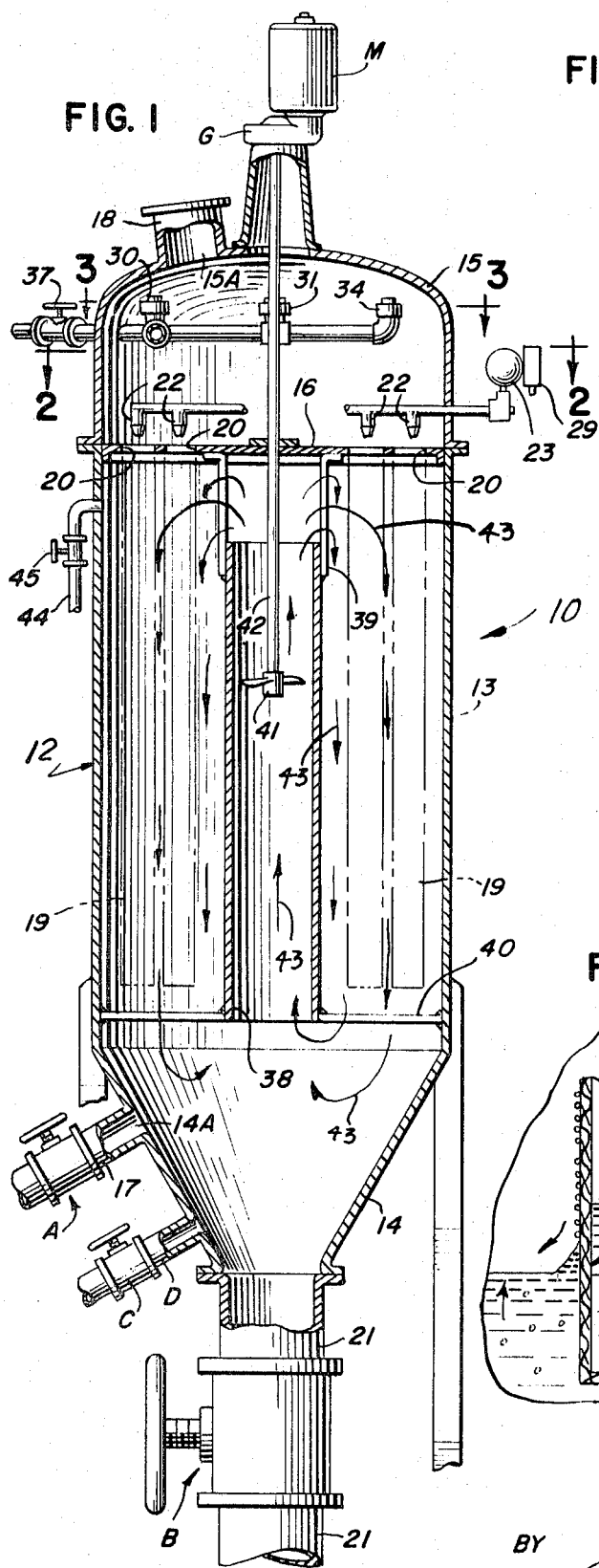
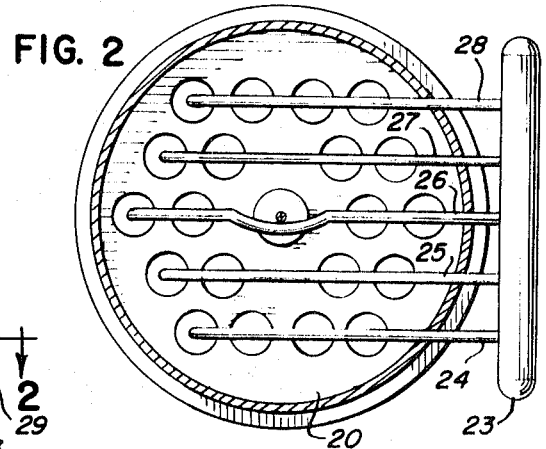
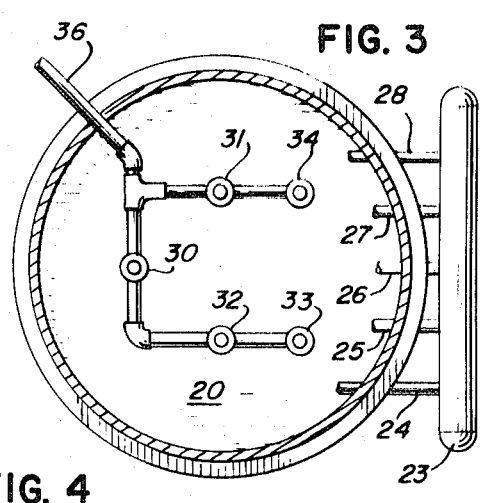
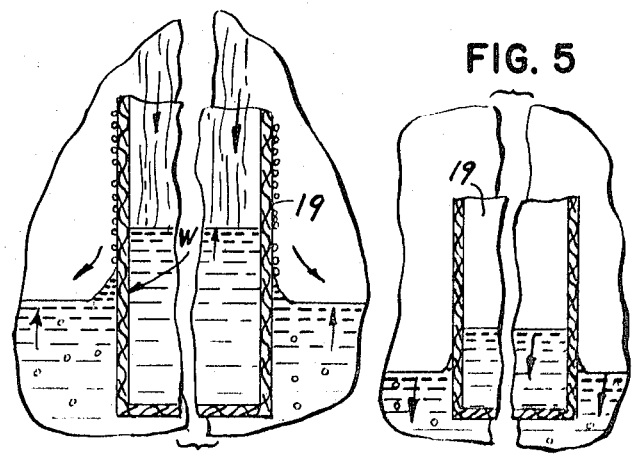
INVENTORS
ROLAND B. CALHOUN
ROBERT H. ERNEST
BY J. Patrick Cagney
ATTORNEY

# United States Patent Office 3,623,910
Patented Nov. 30, 1971

ABSTRACT OF THE DISCLOSURE

A method and apparatus is provided for laundering the interior walls and filter media of a conventional dust collector of the type that utilizes flexible bags for filtering air-borne solids. The apparatus includes a set of sprinkler heads located in the top clean air plenum for introducing fresh cleaning water in the fashion of a hard and uniform rain. The incoming water funnels into the bags and flows in backwashing relation therethrough to progressively fill the collector tank and produce a ring of water discharging outwardly through the bags and progressively sweeping the length of each bag. A draft tube is provided centrally in the intake air plenum and is equipped with an impeller to produce a circulation pattern travelling parallel to the bags.

BACKGROUND OF THE INVENTION

The conventional dust collectors which include an array of flexible bags for filtering air-borne solids are currently used for handling different materials. Where a collector is converted from use with one type of material to another, it is sometimes necessary to avoid cross-contamination. In the food processing industry, for example, where dust collectors are used in handling modified starches in corn processing operations, bacteria problems require periodic thorough cleaning of the collector units. Thus, there is an important need for an efficient and effective technique for cleaning dust collectors.

SUMMARY OF THE INVENTION

The present invention provides a method and apparatus for laundering a dust collector including a thorough laundering of the filter media without need for removing and replacing the same.

The invention is illustrated as applied to a dust collector of the type having an array of vertically elongated sock-shaped flexible filter bags supported from a tube sheet that divides the collector tank to define a lower intake air plenum occupied by the bags and an upper clean air plenum communicating with the interiors of the bags through tube sheet openings in registry with the top end of each bag for conveying the air to a discharge duct after filtering flow through the bags.

The laundering apparatus provided in the illustrated embodiment includes a set of sprinkler heads located in the clean air plenum and introducing clean water therein for funnelling flow into the bags to backwash the filter media while filling the collector tank. The apparatus also includes a draft tube located centrally in the intake air plenum and provided with an impeller that produces a vertical circulation flow pattern characterized by flow parallel to the bags for surface cleaning the filter media.

The laundering method described herein includes the steps of producing a horizontally outwardly discharging ring of water adjacent the inner periphery of each bag to flow outwardly in backwashing relation through the filter media and shifting the ring vertically along the bag to progressively backwash the length of the bag thereby dislodging the insoluble particles on the exterior of the bag and dissolving the soluble particles within the interstices of the bags.

The method steps are carried out by funnelling the laundering water through the bags so that the discharge through the bag rises as the water level in the tank progressively rises. In addition, the agitation cycle, which is characterized by a vertical circulation pattern wherein flow occurs parallel to the exterior surfaces of the bags, supplements the backwashing effect. Thereafter, a second backwashing cycle is produced as the tank is drained, in that the standing water in the bags which is still clean, is caused to produce a ring of backwash flow which progressively sweeps downward along each bag.

These and other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:
FIG. 1 is a vertical section through a dust collector which incorporates apparatus for laundering the unit in accordance with the present invention;
FIG. 2 is a transverse section taken on the line 2—2 of FIG. 1;
FIG. 3 is a transverse section taken on the line 3—3 of FIG. 1; and
FIGS. 4 and 5 are schematic fragmentary sectional views illustrating backwash effects which are utilized in accordance with this invention for providing effective laundering of the filter media while in place.

DESCRIPTION OF PREFERRED EMBODIMENTS

Referring now to the drawings, for purposes of illustrative disclosure, a conventional dust collector 10 is shown as including a tank-like collector housing 12 made up of an intake air plenum 13 of cylindrical outline comprising the central region of the housing, a hopper shaped lower discharge region 14, and an upper dome shaped clean air plenum 15. A horizontal partition 16, commonly termed a bag plate or tube sheet, is disposed within the housing 12 to separate the clean air plenum 15 and the intake air plenum 13. The discharge hopper 14 is provided with an inlet opening 14A that receives an inlet pipe 17 through which a solids laden air stream enters the housing. The clean air plenum 15 has an outlet opening 15A communicating with an outlet pipe 18 through which filtered air emerges. As is well known, the air current through the collector housing 12 enters at the inlet pipe 17, passes upwardly through the intake air plenum 13 and exits through the outlet pipe 18, the desired flow being provided by any suitable fan or blower or other current-producing source (not shown) that provides either negative pressure at the outlet pipe 18 or a positive pressure at the inlet pipe 17.

An array of vertical filter elements 19 is arranged in side-by-side parallel relation in the intake air plenum 13 to establish filtered communication between the intake air plenum 13 and the clean air plenum 15. In accordance with conventional practice, each filter element is in the configuration of an elongated cylindrical sleeve or sock-like bag draped about a skeletal wire cage (not shown) and having its upper end suitably secured to a bag mounting cup (not shown), such cup being anchored in a corresponding opening 20 provided in the tube sheet 16. Typically the bags are of woven cloth construction using materials such as glass, Dacron, Orlon, Teflon, or Nomex depending upon the particular application requirements. In the illustrated bag mounting configuration, the inside face of each filter bag 19 is downstream and the outside face of each filter bag is upstream so that the filtering flow of air through each filter element occurs from outside to inside, the solids being trapped exteriorly on the filter element to build up in layers thereby progressively blocking effective flow through the filter.

It is conventional to clean the filter elements periodically by dislodging the accumulated solids layers from the exterior of the filter elements to permit the solids to fall into the hopper 14 and exit through the discharge pipe 21. In the illustrated embodiment, this is accomplished by momentary release of compressed air from blow-back nozzles 22 located in the clean air plenum 15 to flex the bags sufficiently to dislodge the accumulated solids.

In conventional practice, a separate nozzle 22 is positioned above each bag cup, a compressed air header 23 feeds a set of branch lines 24–28, each suppling four of the nozzles 22, and an automatically timed solenoid actuated valve 29 controls the flow of compressed air into the header 23.

In accordance with this invention, a system is provided for laundering the inside of the tank 12 and particularly the bags 19 without need for removing or replacing the filter media. Laundering may become necessary when the collector is to be converted from use with one type of material to another, for example, to avoid cross contamination. Laundering is frequently necessary when the collector is used in food processing applications to prevent growth of bacteria, for example, salmonella.

In the embodiment illustrated herein for purposes of disclosure, the air inlet pipe 17 is provided with a valve A, the discharge pipe 21 is provided with a valve B, and a drain line D is provided at the bottom of the hopper 14 and is equipped with a valve C for emptying the water after the laundering operation. As shown herein, the clean air plenum 15 is equipped with a number of sprinkler nozzles 30–34 fed from a water supply line 36 controlled by a manual flow valve 37. The sprinkler nozzles 30–34 may be conventional lawn sprinkler heads such as provide a familiar umbrella-shaped spray pattern. Fnally, a draft tube 38 of cylindrical shape is mounted centrally in the intake plenum 13 by means of a plurality of struts 39 projecting endwise at the top of the draft tube and connecting to the tube sheet 16 and by means of a plurality of struts 40 projecting radially at the bottom of the draft tube and connecting to the tank side wall. An impeller 41 is located intermediately within the draft tube 38 at the end of a drive shaft 42 that projects through the top of the tank and is connected through a gear box G to a suitable motor M.

In the laundering operation the valves A, B and C are closed and the water valve 37 is opened to regulate the rate of flow through the sprinkler heads 30–34. The incoming water flows down the wall openings 20 of the bag plate 16 and gradually fills the tank preferably to a level slightly above the bag plate 16. The valve 37 is turned off and the motor M is energized to drive the impeller 41 in a direction to set up a flow circulation pattern as represented by the arrows 43. The tank is then drained by opening the valve C in drain line D. The arrangement of the sprinkler heads and the water pressure discharge conditions achieves a substantially uniform spray distribution pattern throughout the clean air plenum. Thus the spray pattern is similar to a hard rain and also includes upward and outward components impinging on the side walls and roof of the clean air plenum. This spray action is desirable for bacteria removal operations as the clean air plenum is otherwise substantially free of solids.

The water flowing from the clean air plenum 15 to fill the bottom of the tank is funneled through the filter bags 19 and is caused to produce a backwash flow of substantially clean water through the filter media that is, from inside to outside.

A unique backwashing sequence is automatically achieved by the described filling and draining cycles. Initially, the water flows downwardly in each bag and discharges horizontally adjacent the bottom to progressively fill the hopper region 14 and the intake air plenum 13. As the tank water level reaches the bags and rises along the outer surface of the filter media, the continuing funneling of incoming water maintains a head of clean water within each bag as illustrated in FIG. 4. These relationships produce a horizontally outwardly discharging ring of water W adjacent the inner periphery of each bag to flow in backwash relation through the filter media, with the ring W shifting vertically along each bag to progressively backwash the length of the bag.

This backwashing action of the clean incoming water is effective to dislodge not only the solids on the exterior of the bags but also the insoluble particles in the interstices of the filter media. The backwash also acts to dissolve any soluble particles that may be present in the filter media. At the end of the fill cycle the water standing in the bags remains clean.

While the tank is thus filled with water, the impeller 41 is operated during an agitation cycle to produce an upflow through the draft tube 38 and create the circulation pattern illustrated in FIG. 1. This circulation pattern is characterized by a downward flow velocity of about four to five feet per second in the regions where the flow is adjacent to the bag surfaces. This parallel flow acts to clean the exterior of the bags without driving any contaminants into the interior of the bags. The clean water standing in the bags as a result of the backwash action of the fill cycle is maintained during the agitation cycle by virtue of the standing head of water tending to oppose entry of the circulating water into the bags.

An overflow pipe 44 and a manual valve 45 are located adjacent the top of the plenum 13 to allow additional fresh water to be added during the agitation cycle and provide a positive water flow through the bags.

Finally, the drain valve C is opened to empty the tank from the bottom and progressively lower the water level in a reverse sweeping action along the bags. The clean water standing in the bags produces a water ring discharge at the water level as shown in FIG. 5 to provide a second backwashing action that progressively sweeps downwardly along the bags. The second backwashing operation provides a final flushing serving to preclude deposite on the bags of any solid materials contained in the laundering liquid. The second backwashing cycle may be supplemented by opening the water inlet valve 37 to add fresh water to the clean air plenum 15 for funneling flow into the bags to maintain a standing head within each bag sufficient to support the desired ring discharge flow.

The illustrated nozzles 30–34 provide a flow rate of 4 gallons per minute per nozzle. It is desirable to provide enough nozzles to fill the tank in 30 minutes or less. If desired the incoming water may include cleaning or antibacteria agents in accordance with the needs of the particular application. The invention also contemplates successive cycles such as a first rinse cycle to clean the major accumulations, a cleaning cycle for killing bacteria and a final rinse cycle. Each such cycle may include agitation depending upon the requirements.

Thus, while preferred constructional features of the invention are embodied in the structure illustrated herein, it is to be understood that changes and variations may be made by those skilled in the art without departing from the spirit and scope of the appended claims.

What is claimed is:

1. A method for laundering a dust collector of the type having a vertically elongated sock-shaped filter bag that collects airborne particles on its exterior surface, comprising the steps of producing a horizontally outwardly discharging ring of water adjacent the inner periphery of the bag to back-wash through the bag and shifting the ring vertically along the bag to progressively back-wash the length of the bag, said discharging ring being produced and shifted by funneling laundering water into the top of the bag to flow into and through the bag for progressively filling the collector to produce a water level rising upwardly along the bag.

2. A method in accordance with claim 1 and further including the step of draining the water from the collector to allow water standing in the bag to produce a second horizontally outwardly discharging ring of water adjacent the inner periphery of the bag, said second discharging ring of water moving downwardly along the bag in accordance with the falling level of water in the collector to progressively back-wash the length of the bag for a second time.

3. A method in accordance with claim 2 and further including the step of funneling additional fresh water into the top of the bag during the draining step to supplement the second back-wash flow of the outwardly discharging ring of water.

4. A method in accordance with claim 1 and further including the step of agitating the water when the collector is substantially full to produce a vertical circulation pattern characterized by flow parallel to and along the exterior surface of the bag.

5. A method in accordance with claim 4 and further including the step of funneling additional fresh water into the top of the bag during the agitating step to produce a supplemental backwash flow through the bag tending to oppose entry into the bag of water flowing in the vertical circulation pattern.

6. A method for laundering a dust collector of the type having a housing partitioned by a tube sheet having wall openings to provide an intake air plenum beneath the tube sheet and a clean air plenum above the tube sheet and communicating with the intake air plenum through said wall openings, an array of vertically elongated sock-shaped filter bags supported from said tube sheet and disposed in the intake air plenum with each filter bag in top registry with a separate one of said wall openings to intercept and collect airborne particles on its exterior surface, said method including the steps of introducing laundering water into the clean air plenum for funneling flow through the wall openings and into and through the filter bags to progressively fill the housing and produce a horizontally outwardly discharging ring of water that is adjacent the inner periphery of each bag and that moves upwardly along each bag in accordance with the rising level of water in the housing to progressively back-wash the length of the bag and then draining water from the intake air plenum to allow water standing within each bag to produce a second horizontally outwardly discharging ring of water adjacent the inner periphery of each bag, said second discharging ring of water moving downwardly along the bag in accordance with the falling level of water in the housing to progressively back-wash the length of each bag for a second time.

7. A method in accordance with claim 6 wherein the laundering water is introduced into the clean air plenum in a spray pattern distributed thereacross and having upward and lateral components to contact the interior surfaces of the clean air plenum.

8. A method in accordance with claim 6 and further including the step of funneling additional fresh water into the tops of the bags during the draining of the housing to supplement the second backwash flow of each outwardly discharging ring of water.

9. A method in accordance with claim 6 and further including the step of agitating the water in the intake air plenum to produce a vertical circulation pattern therein characterized by flow parallel to and along the exterior of the bags.

10. A method in accordance with claim 9 and further including the step of funneling additional fresh water into the tops of the bags during the agitating step to produce a supplemental backwash flow through the bags tending to oppose entry into the bags of water flowing in the vertical circulation pattern.

11. A method for laundering a dust collector of the type having a housing provided with an array of filter elements arranged in filtering relation to an air stream for collecting air-borne particles on upstream surfaces of the filter elements, said method comprising the steps of filling said housing to a predetermined level with laundering water by producing a backwash flow of incoming laundering water through the filter elements, generating a circulation flow pattern of the laundering water characterized by flow parallel to and along the upstream surfaces of the filter elements for cleaning accumulated solids therefrom and then draining the fill water from the housing.

12. A method in accordance with claim 11 and wherein additional laundering water is introduced to flow in backwash relation through the filtering elements during the draining step.

13. A method in accordance with claim 11 and wherein additional laundering water is introduced to flow in backwash relation through the filtering elements during circulation flow of the laundering water.

14. The combination of laundering apparatus with a dust collector of the type having a housing partitioned by a tube sheet having wall openings to provide an intake air plenum beneath the tube sheet and a clean air plenum above the tube sheet and communicating with the intake air plenum through said wall openings, and an array of vertically elongated sock-shaped filter bags supported from said tube sheet and disposed in the intake air plenum with each filter bag in top registry with a separate one of said wall openings to intercept and collect airborne particles on its exterior surface, said laundering apparatus comprising spray means disposed in said clean air plenum to introduce laundering water therein in a spray pattern distributed thereacross for funneling flow through the wall openings and into and through the filter bags to progressively fill the housing, a vertical draft tube disposed in said intake air plenum, and means including an impeller disposed intermediately in the draft tube and rotatable about a vertical axis to produce a vertical circulation pattern in the intake air plenum characterized by flow parallel to and along the exterior of the bags.

15. The combination in accordance with claim 14 and wherein said spray means includes a plurality of sprinkler heads spaced across the clean air plenum and producing a spray pattern having upward and lateral components to contact the interior surfaces of the clean air plenum.

16. The combination in accordance with claim 14 and having support struts depending from the tube sheet and connecting to the top of said draft tube and radial support struts disposed between the bottom of said draft tube and said housing and connecting said draft tube with said housing to locate the draft tube centrally within said intake air plenum for defining a circulation pattern that is symmetrical about the vertical axis of said tube.

References Cited

UNITED STATES PATENTS

| | | | |
|---|---|---|---|
| 2,226,870 | 12/1940 | McDevitt | 134—170 X |
| 2,513,174 | 6/1950 | Hess | 55—96 UX |
| 2,919,704 | 1/1960 | Butler | 134—166 RX |
| 2,980,207 | 4/1961 | Allen. | |
| 3,053,030 | 9/1962 | Smith | 55—242 |
| 3,089,167 | 5/1963 | Jahn et al. | 134—22 R UX |
| 3,236,248 | 2/1966 | Ray | 134—186 X |
| 3,442,273 | 5/1969 | Hanuh et al. | 134—170 X |
| 3,491,780 | 1/1970 | Kaldenberg | 134—104 |

FOREIGN PATENTS

| | | | |
|---|---|---|---|
| 1,044,842 | 11/1958 | Germany | 55—242 |
| 791,510 | 3/1958 | Great Britain | 55—242 |

JOSEPH SCOVRONEK, Primary Examiner

B. S. RICHMAN, Assistant Examiner

U.S. Cl. X.R.

55—96, 242, 341; 134—22 R, 104, 166 R, 186, 188, 192